Feb. 8, 1927.
R. H. RAUSCH
1,617,165
CONTROL MECHANISM
Filed Feb. 5, 1923
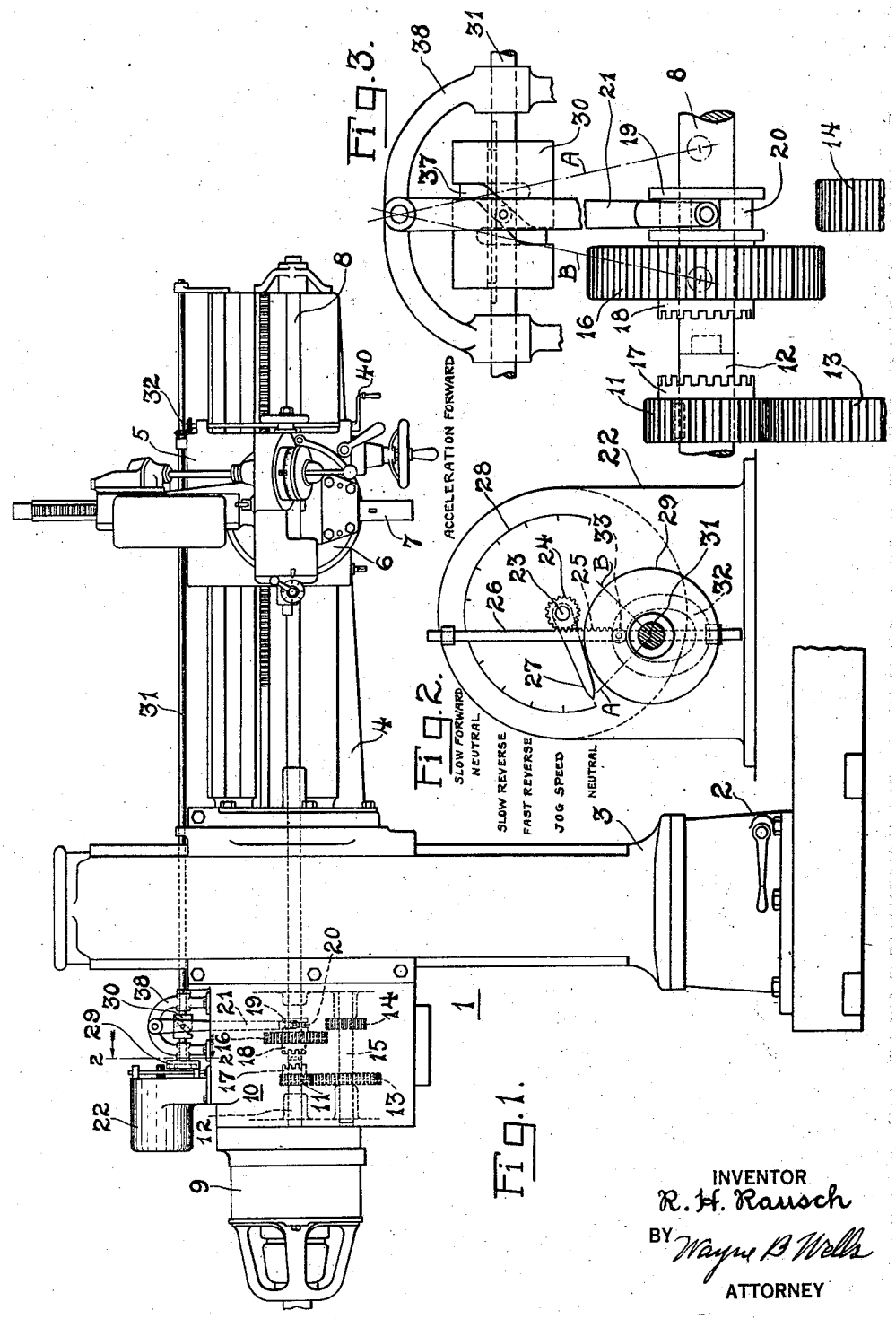
INVENTOR
R. H. Rausch
BY Wayne B Wells
ATTORNEY Patented Feb. 8, 1927.

1,617,165

UNITED STATES PATENT OFFICE.

ROSWELL H. RAUSCH, OF PLAINFIELD, NEW JERSEY, ASSIGNOR TO NILES-BEMENT-POND COMPANY, OF NEW YORK, N. Y., A CORPORATION OF NEW JERSEY.

CONTROL MECHANISM.

Application filed February 5, 1923. Serial No. 617,069.

My invention relates to machine tools and particularly to the control mechanism for radial drills.

One object of my invention is to provide a machine tool having a motor connected through a set of change gears to a cutting tool that shall be provided with means for insuring the operation of the motor at slow speed during the shifting of the gears in said set of change gears.

Another object of my invention is to provide a machine tool having a motor connected through a set of change gears to a drill spindle and a controller for governing the operation of the motor that shall be provided with means for simultaneously operating the controller and said set of change gears.

Another object of my invention is to provide a machine tool having a motor connected to a drill spindle through a set of change gears that shall be provided with a controller for operating the motor at various speeds in a forward and in a reverse direction, two cam members for operating the controller and said set of change gears, and means comprising a manually operated control lever for operating said cam members.

A further object of my invention is to provide a radial drill having a drill arm mounted on the column and a motor mounted on the drill arm and connected through a set of change gears to a drill spindle that shall be provided with a controller for operating the motor in a forward and in a reverse direction, two cam members for respectively operating said controller and said set of change gears, and a manually operated handle located adjacent to the drill spindle for operating said cam members.

In operating change gears in a machine tool, as for example, in a radial drill, it is very advantageous to rotate the gears in the set at a very slow speed during any shifting operation. It is apparent that the rotating of the gear wheels at a slow speed prevents clashing of the gear wheels during the shifting operation. In many radial drills, the shifting of the gear wheels to vary the spindle speed is effected by a lever which is located on the drill arm back of the column supporting the drill arm. The means for controlling the rotation of the drill spindle and accordingly the rotation of the gear wheels comprising the change gears is generally located adjacent to the drill spindle. Thus, in many cases, the means for operating the change gears and the means for operating the drill spindle are somewhat widely separated.

In a machine constructed in accordance with my invention, means are provided for insuring the rotating of the change gear wheels during any shifting operation. Moreover, means are provided whereby the shifting of the gears and the operation of the drill spindle may be controlled by a lever located adjacent to the drill spindle. For example, in the radial drill illustrated in the drawing, an electric motor is connected to the drill spindle through a set of change gears, the motor is operated in a forward and in a reverse direction at various speeds by means of a suitable controller, and the controller and the change gears are respectively operated by two cam members which are mounted on a cam shaft. The cam shaft extends along the drill arm and is operated by a manually operated lever located adjacent to the drill spindle. The two cam members are so constructed and so mounted on the cam shaft with respect to each other that no change in the position of the gears in the change gear set can be made unless the motor is operating at slow speed.

In the accompanying drawing:

Figure 1 is an elevational view of a drill controlled in accordance with my invention.

Fig. 2 is a section along the line 2—2 of Fig. 1.

Fig. 3 is an enlarged view of the cam member for operating the change gears.

Referring to the drawing, a radial drill 1 is shown having a base 2 and a column 3 mounted on the base 2. The column 3, supports a drill arm 4. The drill arm 4 is movable vertically on slides on the column 3. The drill arm 4 carries a saddle 5 which supports a drill head 6. The drill head 6 carries a spindle 7 which in turn supports a suitable tool, not shown. The saddle 5 is movable along slides formed on the drill arm 4 in any suitable manner and the head 6 is rotatable upon the saddle 5. The spindle 7 may be raised and lowered in any suitable manner on the head 6. The spindle is rotated by means of an arm shaft 8 which is connected to a motor 9 in a manner to be hereinafter set forth. For a more complete description as to the construction and operation of the radial drill illustrated, reference may be had to the patent to Willard T. Sears, No. 1,296,863, dated March 11, 1919.

The motor 9, which is mounted on one end of the drill arm 4, is connected to the arm shaft 8 through a set of change gears 10. The set of change gears comprises a gear wheel 11 keyed to a shaft 12, which is directly connected to the armature shaft, two gear wheels 13 and 14, which are keyed to a short shaft 15, and a gear wheel 16 which is slidably mounted on the arm shaft 8 but adapted to rotate therewith. The gear wheels 11 and 16 respectively have clutch teeth 17 and 18 formed thereon and the shafts 12 and 8 are aligned so that the gear wheel 16 may be shifted to effect engagement between the clutch teeth 17 and 18. The gear wheel 16 has a hub 19 formed thereon and a collar 20 is formed on the hub. An arm 21, which is operated in a manner to be hereinafter set forth, has a bifurcated end portion which is fitted to the collar or groove 20 formed on the hub 19. In the construction above set forth, the gear wheel 16 may be moved towards the left, as shown in Fig. 1 of the drawing, to effect engagement between the clutch teeth 17 and 18 and to effect a direct connection between the motor 9 and the arm shaft 8. When the gear wheel 16 is moved towards the right, as shown in Fig. 1 of the drawing, the motor 9 is connected to the arm shaft 8 through the auxiliary shaft 15. In the latter connection it will be noted the speed of rotation of the arm shaft 8 and accordingly of the spindle 7 will be very much reduced.

A controller 22, which is mounted on the arm 4 above the change gears 10, is adapted to operate the motor 9 in a forward and in a reverse direction at various speeds. The controller is preferably of the drum type and may be of any suitable construction. The shaft 23 of the controller carries a pinion 24 which meshes with rack teeth 25 formed on a rod 26. Preferably a pointer 27 is fixedly connected to the shaft 23 for moving over a dial 28 to indicate the operative position of the controller. In Fig. 2 of the drawing, the operative position of the motor for each position of the controller has been indicated.

Preferably, in a drill constructed and operated in accordance with my invention, means are provided for simultaneously operating the change gears 10 and the drum controller 22. As before set forth, it is desirable to effect operation of the motor at a very slow speed when effecting any shifting operation of the change gears. In the accompanying drawing, my invention has been illustrated by respectively controlling the controller 22 and the change gears 10 by means of cam members 29 and 30 which are mounted on a cam shaft 31. The cam member 29 has a cam groove 32 formed therein which serves to control the operation of the controller 22. On the end of the rod 26 is mounted a roller 33 which rides in the groove 32. Thus, the movement of the cam member 29 is transmitted through the rod 26 to the shaft 23 of the controller. In Fig. 2 of the drawing, the controller 22 is shown in neutral position and movement of the cam member 29 in a clockwise or in a counterclockwise direction to position B or to position A will effect no movement whatsoever of the shaft 23 and accordingly of the controller. The movement of the controller at such time is arrested in order to permit shifting of the gear wheel 16 prior to the engagement of the clutch teeth 17 and 18 or the meshing of the gear wheel 16 with the gear wheel 14.

Referring to Fig. 2 of the drawing, it will be noted that no matter which direction the shaft 31 is rotated the controller shaft 23 will be given a movement of rotation in a clockwise direction. The controller 22 is shown in neutral position. The next position of the controller operates the motor at a very slow or jogging speed in a reverse direction. It is in this position of the controller that meshing of the gear wheels during a shifting operation is effected. In the adjacent position of the controller, the motor operates in a reverse direction at a fast speed. In the next position of the controller, the motor is operated at a slow speed in a reverse direction. At the next position the controller is thrown into neutral and in the following positions the motor is accelerated to full speed in a forward direction.

Referring to Fig. 3 of the drawing, the cam member 30, which is mounted on the cam shaft 31, has a cam groove 37 formed therein which serves to effect movement of the arm 21. The arm 21 is pivotally mounted on a bracket 38 and is provided with a pin 39 which projects into the cam groove 37. The bracket 38 is suitably mounted on the radial arm 4 and also preferably serves as a bearing for the cam shaft 31. In Fig. 3 of the drawing, the arm 21 is shown in a neutral position so that the motor 9 is disconnected from the drill spindle 7. A movement of the arm 21 towards the left to position B effects engagement between the clutch teeth 17 and 18 and a movement of the arm 21 towards the right effects meshing between the gear wheels 14 and 16. The position of the arm 21 towards the right has been indicated by the character A. The characters A and B have also been used in Fig. 2 of the drawing to indicate the position of the cam member 29 corresponding to the positions of the arm 21. Thus, when the arm 21 is moved to the left to position B to effect engagement between the clutch teeth 17 and 18, the cam member 29 is in position B and when the arm 21 is moved to the right to position A to effect connection between the motor 9 and the shaft 8 through the auxiliary shaft 15, the cam member 29 is moved to position A.

The cam members 29 and 30 are so constructed and are so adjusted with respect to each other that meshing of the gear wheels in the set of change gears 10 is always effected when the motor 9 is operating at the jogging speed. Thus, the clashing of the gear teeth is prevented. Moreover, it should be noted, as before set forth, that no matter which direction the shaft 31 is rotated from neutral to effect either a direct connection between the motor 9 and the shaft 8 or an indirect connection between the motor and the shaft 8, the controller shaft is always rotated in a clockwise direction. The cam shaft 31, which carries the cam members 29 and 30, preferably extends along the drill arm 8 and is provided with suitable bearings on said arm. On the saddle 5 is mounted a crank arm 40 which is connected to the cam shaft 31 by means of a set of bevel gear wheels 32. Thus, by moving the crank arm 40, the cam members 29 and 30 may be operated to simultaneously operate the controller 22 and the change gears 10.

While the form of mechanism herein shown and described constitutes a preferred form of embodiment of the invention, it is to be understood that other forms may be adopted, all coming within the scope of the claims which follow.

What I claim is:

1. In a machine tool, the combination comprising a set of change gears, a motor connected to said change gears, a controller for governing the operation of said motor, and means comprising a manually operated lever for operating said controller and said change gears, movement of said lever during a portion of its movement simultaneously operating said controller and change gears, and movement of the controller during another portion of its movement moving said controller only.

2. In a machine tool, the combination comprising a rotatable tool spindle, a motor for rotating said spindle, a controller for governing the operation of said motor at various speeds in a forward and in a reverse direction, a cam member for operating the controller, a set of change gears for varying the spindle speed, a cam member for operating the change gears and means comprising a manually operated lever for operating said controller and said change gears, movement of said lever during a portion of its movement simultaneously operating said controller and change gears, and movement of the controller during another portion of its movement moving said controller only.

3. In a machine tool, the combination comprising a tool spindle, a motor for operating said spindle, a controller for operating said motor at various speeds in a forward and in a reverse direction, a cam member for operating said controller, a set of change gears connected between the motor and said spindle, a cam member for operating said change gears, and means comprising a manually operated lever for simultaneously operating said cam members to govern the operation of the controller and said change gears.

4. In a machine tool, the combination with a motor, a tool spindle, a set of change gears for connecting the motor to said tool spindle, a controller for governing the operation of said motor, and two cam members for controlling said controller and said change gears, of means for simultaneously operating said cam members, said cam members adapted to move said gears during a portion only of the movement of said controller.

5. In a machine tool, the combination with a motor, a tool spindle, a set of change gears for connecting the motor to said tool spindle, and a cam member for operating said change gears to vary the speed of the spindle, of a controller for operating said motor in a forward and in a reverse direction and for varying the motor speed, a cam member for operating said controller, and means comprising a manually operated lever for simultaneously operating said two cam members, said cam members adapted to move said gears during a portion only of the movement of said controller.

6. In a drill, the combination with a tool spindle, a source of power for operating said spindle, connecting means between said source of power and the spindle for varying the spindle speed, means for controlling said source of power to vary the speed of the spindle, and means comprising a manually operated lever for operating said controller and said change gears, movement of said lever during a portion of its movement simultaneously operating said controller and change gears, and movement of the controller during another portion of its movement moving said controller only.

7. In a drill having a drill arm mounted on a column, the combination with a motor, a tool spindle, a set of change gears for connecting the motor to said spindle and for operating the spindle at various speeds, a controller for governing the operation of said motor at various speeds in a forward and in a reverse direction, and means comprising a manually operated lever for operating said controller and said change gears, movement of said lever during a portion of its movement simultaneously operating said controller and change gears, and movement of the controller during another portion of its movement moving said controller only.

8. In a drill, the combination with a motor, a tool spindle operated by said motor, a set of change gears connected between the motor and said spindle for varying the spindle speed, and a controller for governing the operation of said motor, of a rotatably mounted shaft having two cam members fixedly mounted thereon, one of said cam members serving to operate said change gears when said shaft is rotated to vary the spindle speed and the other cam member serving to simultaneously operate said controller to govern the operation of the motor, and a control handle located adjacent to said spindle for operating said shaft.

9. In a drill, the combination with a motor, a tool spindle, a set of change gears connected between the motor and said spindle for operating the spindle at different speeds, a controller for operating the motor at different speeds in a forward and in a reverse direction, and means comprising a manually operated lever for operating said controller and said change gears, movement of said lever during a portion of its movement simultaneously operating said controller and change gears, and movement of the controller during another portion of its movement moving said controller only.

10. In a radial drill having a drill arm mounted on a column, the combination with a motor mounted on the arm, a tool spindle, a set of change gears for connecting the motor to said spindle, and a controller for governing the operation of the motor, of a shaft mounted on said arm, two cam members mounted on said shaft one operating said controller and the other operating said change gears, and means comprising a crank arm located adjacent to said spindle for operating said shaft.

11. In a radial drill, the combination with a motor, a drill spindle connected to said motor, a set of change gears connected between said motor and the spindle, and a controller for governing the operation of said motor, of a cam member for operating said change gears, a second cam member coaxial with said first cam member for operating said controller, the change gear cam member being disposed and formed with respect to the controller cam member so that the motor is operated at very slow speed during the shifting of any gear, and manual operated means for simultaneously operating said cam members.

In testimony whereof, I hereunto affix my signature.

ROSWELL H. RAUSCH.